(12) United States Patent
Venkatachalam et al.

(10) Patent No.: US 7,391,776 B2
(45) Date of Patent: Jun. 24, 2008

(54) MICROENGINE TO NETWORK PROCESSING ENGINE INTERWORKING FOR NETWORK PROCESSORS

(75) Inventors: Muthu Venkatachalam, Hillsboro, OR (US); Daniel G. Borkowski, Lunenburg, MA (US)

(73) Assignee: Intel Corporation, Santa Clara, CA (US)

( * ) Notice: Subject to any disclaimer, the term of this patent is extended or adjusted under 35 U.S.C. 154(b) by 831 days.

(21) Appl. No.: 10/738,407

(22) Filed: Dec. 16, 2003

(65) Prior Publication Data

US 2005/0149602 A1 Jul. 7, 2005

(51) Int. Cl.
*H04L 12/56* (2006.01)
(52) U.S. Cl. .................................. 370/395.1; 370/229
(58) Field of Classification Search .................. 370/229, 370/395.1
See application file for complete search history.

(56) References Cited

U.S. PATENT DOCUMENTS

| | | | | |
|---|---|---|---|---|
| 6,052,580 | A | 4/2000 | Khakoo | 455/418 |
| 6,356,951 | B1 * | 3/2002 | Gentry, Jr. | 709/250 |
| 6,389,468 | B1 * | 5/2002 | Muller et al. | 709/226 |
| 6,643,276 | B1 * | 11/2003 | Spets et al. | 370/328 |
| 7,106,696 | B1 * | 9/2006 | Lim et al. | 370/230.1 |
| 2002/0108037 | A1 * | 8/2002 | Baker | 713/168 |
| 2003/0131228 | A1 * | 7/2003 | Twomey | 713/153 |
| 2004/0120314 | A1 * | 6/2004 | Chakrabarti et al. | 370/364 |
| 2004/0190512 | A1 * | 9/2004 | Schultz | 370/389 |
| 2004/0213255 | A1 * | 10/2004 | Brinkerhoff et al. | 370/395.1 |

OTHER PUBLICATIONS

Spirent Communications teaches Inverse Multiplexing for ATM—Scalable ATM Network Access, White Paper, Jan. 2003*

* cited by examiner

*Primary Examiner*—Wing F. Chan
*Assistant Examiner*—Anthony Sol
(74) *Attorney, Agent, or Firm*—Daly, Crowley, Mofford & Durkee, LLP

(57) ABSTRACT

A method and apparatus to control interaction between two multi-threaded processor engines is presented. A first multi-threaded processor engine is configured for connection to a serial link, and performs receive and transmit operations in a first "PHY" mode of operation. A second multi-threaded processor engine is operable to process data received by the first multi-threaded processor over the serial link and to provide the processed data to the first multi-threaded processor engine for transmission over the serial link, when the first multi-threaded processor operates in the PHY mode. Additionally, the first multi-threaded processor engine is configured to execute certain operations, e.g., hardware accelerator operations, at the request of the second multi-threaded processor engine in a second "co-processor" mode of operation.

36 Claims, 13 Drawing Sheets

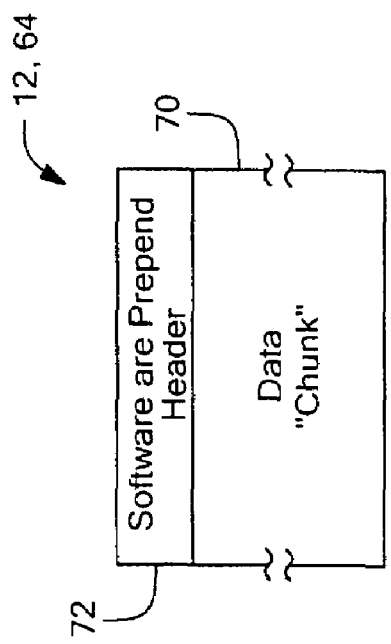
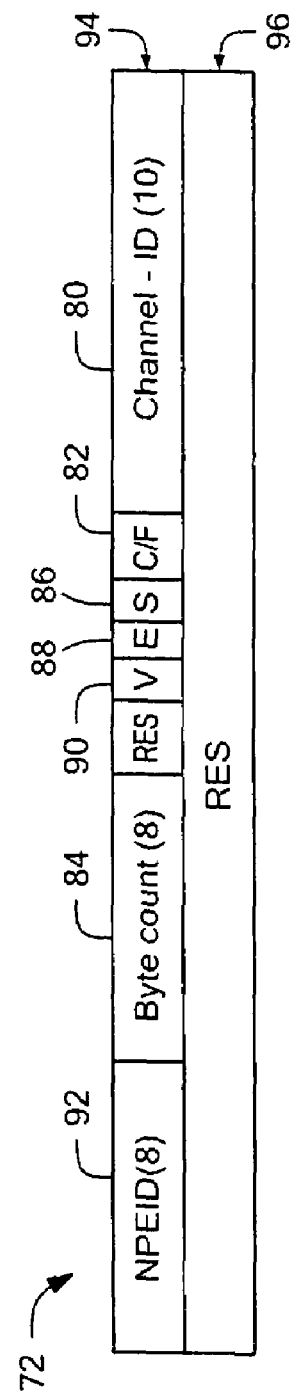

MICROENGINE TO NETWORK PROCESSING ENGINE INTERWORKING FOR NETWORK PROCESSORS

BACKGROUND

In recent years, intelligent network interface devices have evolved from customized, mostly hardware-implemented devices to highly programmable network processors capable of multi-threaded, parallel data processing. Some network processors use internal multi-threaded processing elements ("microengines") designed to handle packet-level processing typically associated with layer 3 protocol-based processing, while other network processors use different internal multi-threaded processing elements ("network processing engines") to handle processing functions typically associated with the physical and data link layer protocols. These two types of processing elements have significantly different performance capabilities.

DESCRIPTION OF THE DRAWINGS

FIG. 3A is an exemplary layout of a receive buffer element, including a software prepend header followed by a "chunk" of frame data or a cell.

FIG. 3B is an exemplary format of the software prepend header (from FIG. 3A).

DETAILED DESCRIPTION

Figure 1:
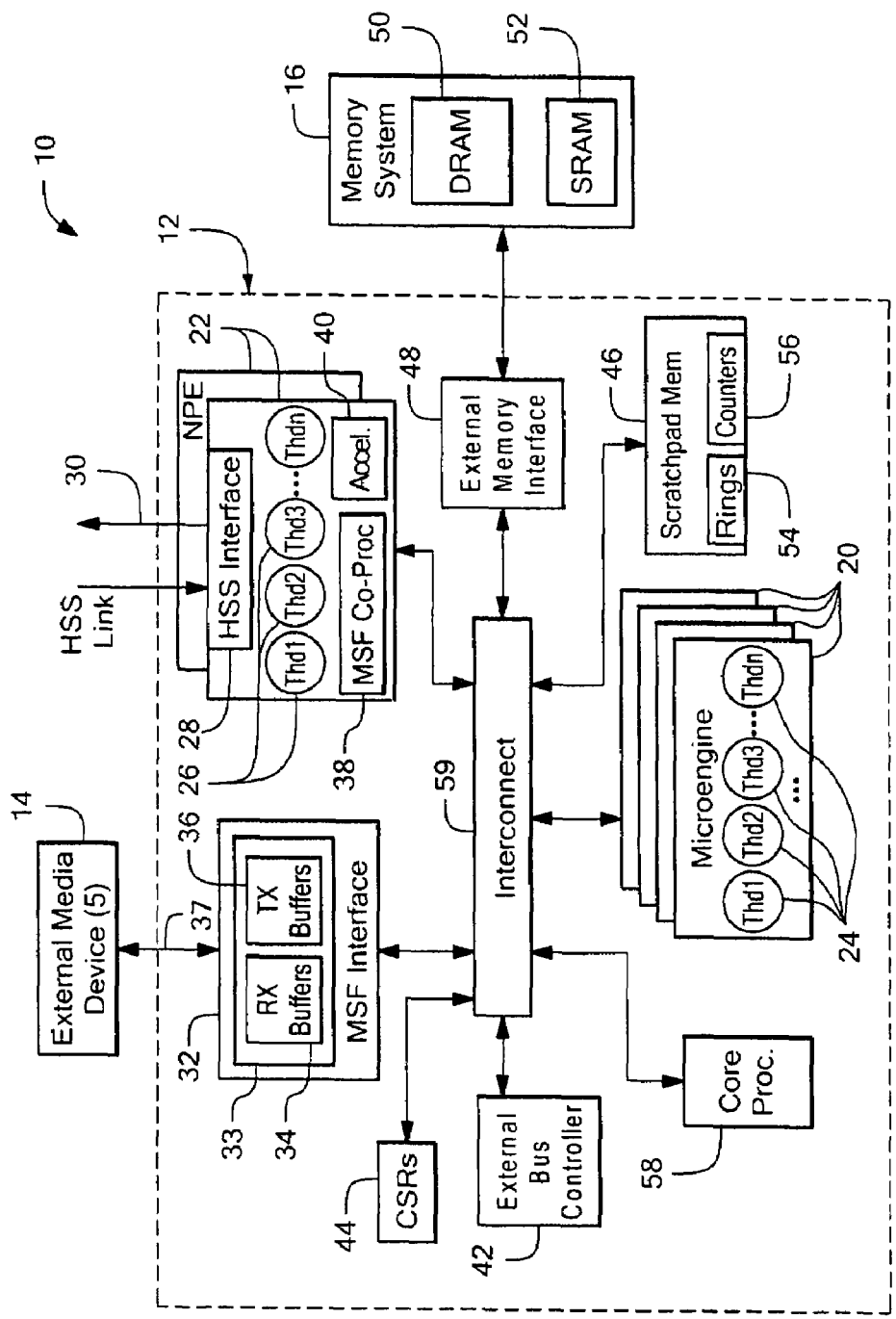
FIG. 1 is a block diagram of a system that includes a network processor having multi-threaded processors, including a network processing engine (NPE) to transmit and receive data over digital time-division multiplexed (TDM) serial channels, a microengine (ME) to process the data and a media and switch fabric (MSF) interface through which the ME and NPE pass the data and exchange control messages.

Referring to FIG. 1, a system 10 includes a network processor 12 coupled to one or more external media devices 14 and a memory system 16. The network processor 12 includes two types of multi-threaded processor engines, including "microengines" (MEs) 20 and network processing engines (NPEs) 22. Each of the MEs 20 is capable of processing multiple execution threads ("n" threads) 24. Each of the microengines 20 is connected to and can communicate with adjacent microengines to form a processing pipeline. Each NPE 22 supports some number ("m") of execution threads 26 as well. The network processor 12 uses the ME 20 as a fast computational and communication element and the NPE 52 as a relatively slower computational and communication element in a fast-path processing framework. The ME 20 handles processing tasks typically associated with layer 3 protocol processing, while the NPE 22 performs functions off-loaded by the ME in a mode referred to herein as a "ME co-processor mode" as well as physical and data link layer processing tasks in a second mode, referred to herein as a "PHY mode".

The external media devices 14 can be any network devices capable of transmitting and/or receiving network traffic data, such as framing/MAC devices, e.g., for connecting to 10/100BaseT Ethernet, Gigabit Ethernet, Asynchronous Transfer Mode (ATM) or other types of networks, or devices for connecting to a switch fabric. For example, in one arrangement, one of the devices 14 could be an Ethernet MAC/PHY device (connected to an Ethernet network, not shown) that transmits data to the network processor 12 and a second device could be a switch fabric device that receives processed data from network processor 12 for transmission onto a switch fabric.

The NPE 22 supports high-speed serial traffic, such as time-division-multiplexed (TDM) traffic carried over a serial channel. To handle the receive/transmit of such channelized serial traffic, the NPE 22 includes a high-speed serial (HSS) interface or co-processor 28. The HSS interface 28 operates as a physical layer interface to receive and transmit data in a serial data stream in multiple channels over one or more serial links 30. The HSS interface 28 supports one or more high-speed serial protocols, e.g., T1, E1 and J1. The NPE threads 26 perform data link layer (e.g., layer 2) processing on the received serial data. In the described embodiment, the serial channel data can include High-level Data Link Control (HDLC) frames as well as ATM cells. Thus, the NPE 22 is configured to support both frame-based protocols, e.g., for HDLC frames, and cell-based protocols to handle, for example, Asynchronous Transfer Mode (ATM) and Inverse Multiplexing for ATM (IMA) over serial TDM links.

More generally, the term "frame-based protocol" refers to any protocol that helps carry variable size frames on individual TDM channels and the term "cell-based protocol" refers to any protocol that helps carry fixed size cells on individual TDM channels. Each TDM channel is allocated a number of timeslots in a frame carried over a serial link, for example, an E1 or a T1 frame. Typically, a timeslot is a 1-byte unit of transmission. In the described embodiment, channels carrying frame-based protocols can include large channels ("L-channels") and small channels ("S-channels"). The L-channels and S-channels are defined to have a certain number of assigned timeslots. In the embodiment described herein, for example, each L-channel is allocated 16-32 timeslots in a 32 timeslot E1 frame and each S-channel is allocated 1-15 timeslots it in a 32 timeslot E1 frame.

The MEs 20 interface with the NPEs 22 and the external media devices 14 via an interface referred to herein as a media and switch fabric (MSF) interface 32. Thus, in the illustrated embodiment, both the NPE 22 and the external media devices 14 are sources of data, and the MSF interface 32 is the interface through which all movement of data to the MEs and from the MEs 20 (for purposes of receive/transmit) occurs. The MSF interface 32 includes hardware control for receive and transmit operations, as well as internal buffers 33 to store receive data (RX buffers 34) and transmit data (TX buffers 36). The receive data includes data received directly from the external media devices 14 as well as data received on the HSS links 30 (via the NPE 22) to be provided to the MEs 20 for further processing. The transmit data includes data being passed from the MEs 20 to the external media devices 14 or NPE 22 via the MSF interface 32 for transmission over an external connection. The MSF interface 32 is coupled to the external media devices via I/O bus lines 37.

With respect to the external media devices 14, the MSF interface 32 supports one or more types of external media device interfaces, such as an interface for packet and cell transfer between a PHY device and a higher protocol layer (e.g., link layer), or an interface between a traffic manager and a switch fabric for ATM, Internet Protocol (IP), Ethernet, and similar data communications applications.

In the illustrated embodiment, the NPE 52 includes additional co-processors, in particular, a co-processor for interfacing with the MSF interface 32, shown as MSF co-processor 38, and another co-processor to serve as an accelerator to assist an ME with certain processing tasks, shown as ME co-processor 40. Those tasks may include for example, encryption/decryption, as well as other tasks.

The MEs 20 and NPEs 22 each operate with shared resources including, for example, the memory system 18 and the MSF interface 32, as well as an external bus interface (e.g., a Peripheral Component Interface or "PCI" bus interface) 42, Control and Status Registers (CSRs) 44 and a scratchpad memory unit 46. The memory system 18, accessed through an external memory controller 48, includes a Dynamic Random Access Memory (DRAM) 50 and a Static Random Access Memory (SRAM) 52. Although not shown, the network processor 12 also would include a nonvolatile memory to support boot operations. The DRAM 50 is typically used to store large volumes of data, e.g., payloads from network packets. The SRAM 52 is typically used to store data required for low latency, fast access tasks, e.g., accessing look-up tables, storing buffer descriptors and free buffer lists, and so forth. The scratchpad memory unit 46 is configured with various data structures used by the MEs and NPEs, in particular, scratch rings 54 and counters 56, as will be described in more detail below.

In one embodiment, as illustrated in FIG. 1, the network processor 12 also includes a processor ("core" processor) 58 that assists in loading microcode control for the MEs 20, NPEs 22 and other resources of the network processor 12, and performs other general-purpose computer type functions such as handling protocols and exceptions. The processor 58 can also provide support for higher layer network processing tasks that cannot be handled by the microengines 20.

Each of the functional units of the network processor 12, that is, units 20, 22, 32, 42, 44, 46, 48, 58, is coupled to an internal bus structure or interconnect 59 to enable communications between the various functional units. Other devices, such as a host computer and/or bus peripherals (not shown), which may be coupled to an external bus controlled by the external bus controller 42, can also serviced by the network processor 12.

The difference in compute and communication capacities of the ME 20 and NPE 22 poses some significant challenges when the ME 20 attempts to send data to the NPE 52 for transmission on one of the channels, and can cause flow control problems such as channel overflows and underflows. Underflows can have serious (often "fatal") consequences for a transmission at the destination if they occur during the transmission of a variable sized frame (e.g., HDLC) on a TDM channel. Such an underflow is referred to herein as a "critical underflow". Thus, it is critical that the MEs 20 not starve any of the serial channels supported by the NPE 22 while variable sized frames are being transmitted on those serial TDM channels. If a serial channel is starved for data during frame transmission, the transmitted frame from the NPE 22 will be discarded at the destination node where it is received. The impact of underflows between frame transmissions is not as severe, but can degrade the throughput of the TDM channel just the same.

Overflows that occur when the ME attempts to send data to the NPE can also be harmful in terms of degrading the channel throughput and causing data losses.

The ME-to-NPE interworking architecture of the network processor 12 contemplates these critical underflow, underflow and overflow scenarios, and prevents their occurrence. The significantly different requirements and challenges for frame-based communication versus cell-based communication between the ME and NPE are also addressed by the ME-to-NPE interworking architecture.

The two "fast-path" processing engines, that is, the ME 20 and the NPE 22, can interact according to two different operating modes—the "PHY mode" and the "ME co-processor mode", as discussed earlier. In the PHY mode, the NPE 22 is treated as a PHY (that is, like one of the external media devices 14) by the ME 20. In the PHY mode, the NPE 22 provides channelized serial data to the ME 20 for packet-level processing. In the ME co-processor mode, the NPE 22 operates as an ME co-processor, handling specific tasks at the request of an ME. These two modes of operation are described in further detail below.

Figure 2:
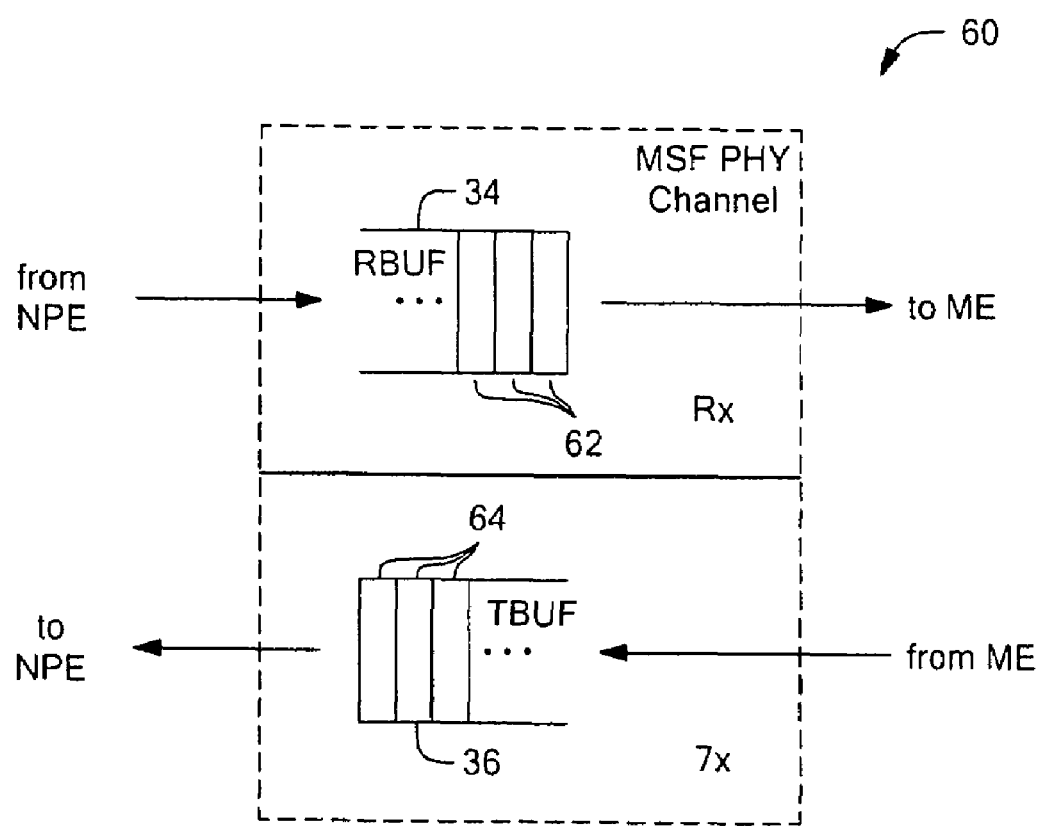
FIG. 2 is a depiction of a dedicated channel (in the MSF interface) with a set of receive and transmit buffers used by an ME and NPE when the NPE is operating in a "PHY mode".

Referring now to FIG. 2, the NPEs 22 share a single MSF PHY channel 60 in the form of a set of one or more of the receive buffers ("RBUFs") 34, transmit buffers ("TBUFs") 36 and a number of dedicated bits on an MSF interface bus (not shown). Each RBUF 34 includes a number of RBUF elements 62 and each TBUF 36 includes a number of TBUF elements 64.

Referring to FIGS. 3A and 3B, an exemplary layout of the buffer elements 62, 64 is shown. Data movement into and out of the MSF PHY channels 60 occurs in fixed-sized "chunks". Thus, each buffer element 62, 64, once filled, includes a unit of data having a maximum size of a "data chunk" 70 preceded by a software prepend header 72 prepared by the NPE MSF co-processor 38 (from FIG. 1). The format of the software prepend header 72 is shown in FIG. 3B. The software prepend header 72 includes the following fields: a Channel-ID field 80; a C/F (=0) field 82; a byte count field 84; a start ("S") field 86; an end ("E") field 88; a valid("V") field 90; and an NPE ID ("NPEID") field 92. The Channel-ID field 80 identifies the number of the TDM channel with which the data chunk is associated. The C/F (=0) field 82 identifies the channel protocol as cell-based or frame-based. The byte count field 84 provides the total number of bytes transferred for the TDM channel identified in field 80, exclusive of the software prepend header, that is, the number of bytes in the data chunk 70. The S field 86 is a 1-bit SOP field indicating that the data chunk is the starting chunk of a frame on the TDM channel. The E field 88 is a 1-bit EOP field indicating that the data chunk is the ending chunk of the frame on the TDM channel. The V field 90 is a 1-bit used to indicate if the frame is valid or not, based on the payload header check in the NPE (if any, for example CRC-check for HDLC frames, HEC check for ATM cells). This bit is set for all of the chunks of the frame, except for the last chunk, where it may not be set if the frame turns out to be invalid. The NPEID field 92 provides the ID of the NPE that is receiving/transmitting the data, so that in the case of multiple NPEs, the ME can distinguish as to which NPE the data is coming from (in the receive direction) and which NPE the data is to be directed (in the transmit direction).

In the illustrated embodiment, the software prepend header 72 is contained in two long words. All of the useful information needed for the reassembly and further processing of the TDM data by the ME 20 is included in a first long word 94. A second long word 96 maintains the byte alignment needed for transfers between the MSF interface 32 and memory, for example, the DRAM 50. The second long word 96 is discarded by the ME 20 (on receive) and the NPE 22 (on transmit). The second long word 96 may be used to carry other information instead of or in addition to byte alignment information.

Associated with each populated buffer element is a buffer element descriptor (not shown), more particularly, a "receive status word"(RSW) describing an RBUF element that is being written by an NPE and a "transmit control word" (TCW) describing an TBUF element that is being written by an ME. In one implementation, the descriptors are two long words in length.

During a receive operation, the NPE 22 reassembles channel data arriving on multiple TDM channels. The NPE 22 uses the MSF co-processor 38 that interfaces to the MSF-PHY channel 60, in particular, the RBUF 34 allocated to that NPE 22, to write the data into one of the RBUF elements 62 of the RBUF 34. The data unit that is written may be in the form of a portion of a frame for a TDM channel equal to a data chunk when the NPE is operating in frame-based mode and a cell for a TDM channel operating in cell-based mode. All of the data link level operations associated with extracting the actual payload (for example, bit stuffing for HDLC, scrambling for ATMoS, and so forth) are handled by the NPE 22. The ME 20 reads the data chunk (payload) 70 from the RBUF element 72. The RBUF element size is programmable. Preferably, it is greater than the total of the maximum possible chunk size and the software prepend header 72.

Figure 4:
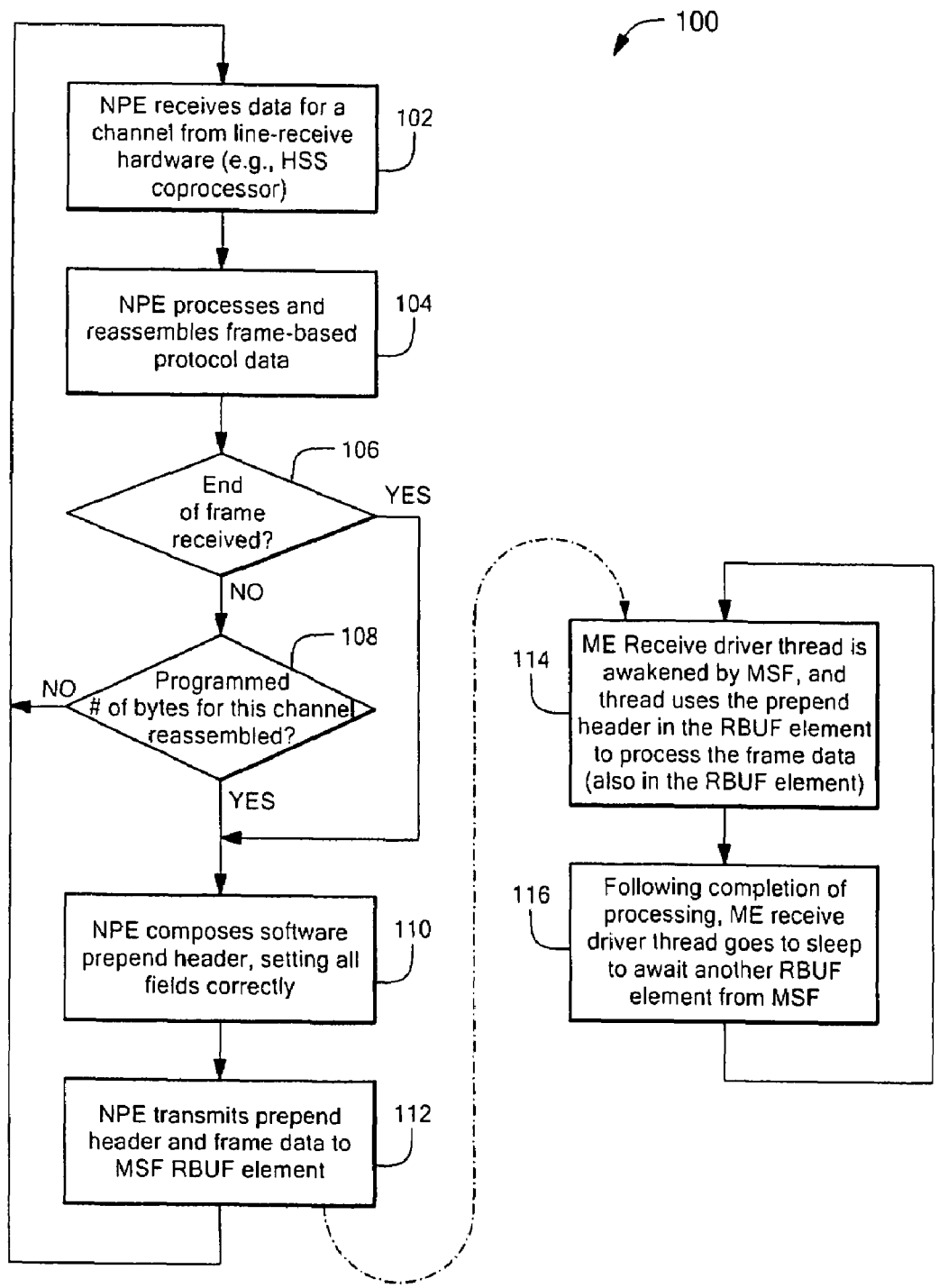
FIG. 4 is a flow diagram depicting operation of the NPE and ME when the NPE is operating in PHY mode on receive for frame-based protocols.

Referring to FIG. 4, an exemplary receive operation for frame-based protocols 100 is as follows. The NPE 22 receives 102 data in the form of TDM bytes for a particular TDM channel via its HSS interface 28. The NPE 22 processes and re-assembles 104 a programmable number ("k") of TDM bytes of frame-based protocol data for the channel. This number k corresponds to the size of the data chunk. It can be different for different TDM channels based on the data rates, but has to be less than the RBUF element size. It will be noted that the TDM bytes may be valid or invalid. An error check on the frame payload (when the whole frame is received into the NPE) may indicate that the frame is invalid, so the entire reassembled frame at the ME 20 may have to be dropped at a later stage. The NPE 22 determines 106 if an end of a frame has been received. If not, the NPE determines 108 if the programmed number of bytes k for the channel has been reassembled. If the programmed number of bytes has not yet been reassembled, the NPE continues to receive, process and reassemble data (at 102, 104). If, at 106, it is determined that an end of frame has been received or, at 108, it is determined that the number of programmed bytes has been reassembled, the NPE 22 prepends 110 the programmed number of bytes with a software prepend header (formatted as shown in FIG. 3B). The NPE MSF co-processor sends 112 the programmed number of bytes of the TDM channel (data chunk) along with the software prepend header to an RBUF element of the RBUF designated by the MSF interface hardware.

The RSW associated with the RBUF element being written by the NPE is written to the internal transfer registers of the ME to process the data. The RSW provides to that ME the location of the buffered data, that is, the RBUF number (and MSF PHY channel number) and the RBUF element number where the data is stored. One of the ME threads configured as a receive thread (receive driver) is awakened by the MSF interface and uses 114 the software prepend header (in the RBUF element described by the RSW) to process the data chunk (stored in that same RBUF element). In most applications, the ME receive thread reads the header into the ME and moves the data chunk directly from the RBUF element to the DRAM 50 where the frame payload is stored. Upon completion of the processing by the ME receive thread, the ME receive thread goes to sleep 116 to await signaling from the MSF interface that another RBUF element is ready to be processed.

The ME receive thread extracts the TDM channel number from the Channel-ID field 80 of the software prepend header 72. The ME receive thread performs reassembly based on the receive context for this TDM channel and other parameters from the software prepend header 72, including the settings of the S, E and V bits. If the E bit 88 is set, and the V bit 90 is not set, the ME receive thread drops the reassembled frame.

The main difference between the frame-based and cell-based protocols is that, for the cell-based protocols, the NPE 22 sends valid cells to the ME 20 via the MSF interface 32. In the illustrated embodiment, the cell size is less than the programmed number of bytes k (or data chunk size). The ME 20 would do the optional cell to frame conversion (for example, AAL based re-assembly, in case of ATM, especially ATMoS and IMA) based on the individual valid cells that it receives from the NPE 22. The software prepend header 72 shown in FIGS. 3A-3B is the same format for the cell-based and frame-based modes.

The following conditions must hold for the cell-based receive operation. First, the RBUF element should be sized to accommodate the cell along with the software prepend header. The C/F field 82 in the software prepend header 72 is set to 1. The S, E, V bits in the software prepend header 72 all have to be set for every cell received on the RBUF element. If they are not set, the cell will be discarded by the ME 20. In the case of ATM, neither the RSW nor the software prepend header 72 contains the VPI/VCI values of the cell. Thus, the VPI/VCI values need to be read from the actual cell header.

Figure 5:
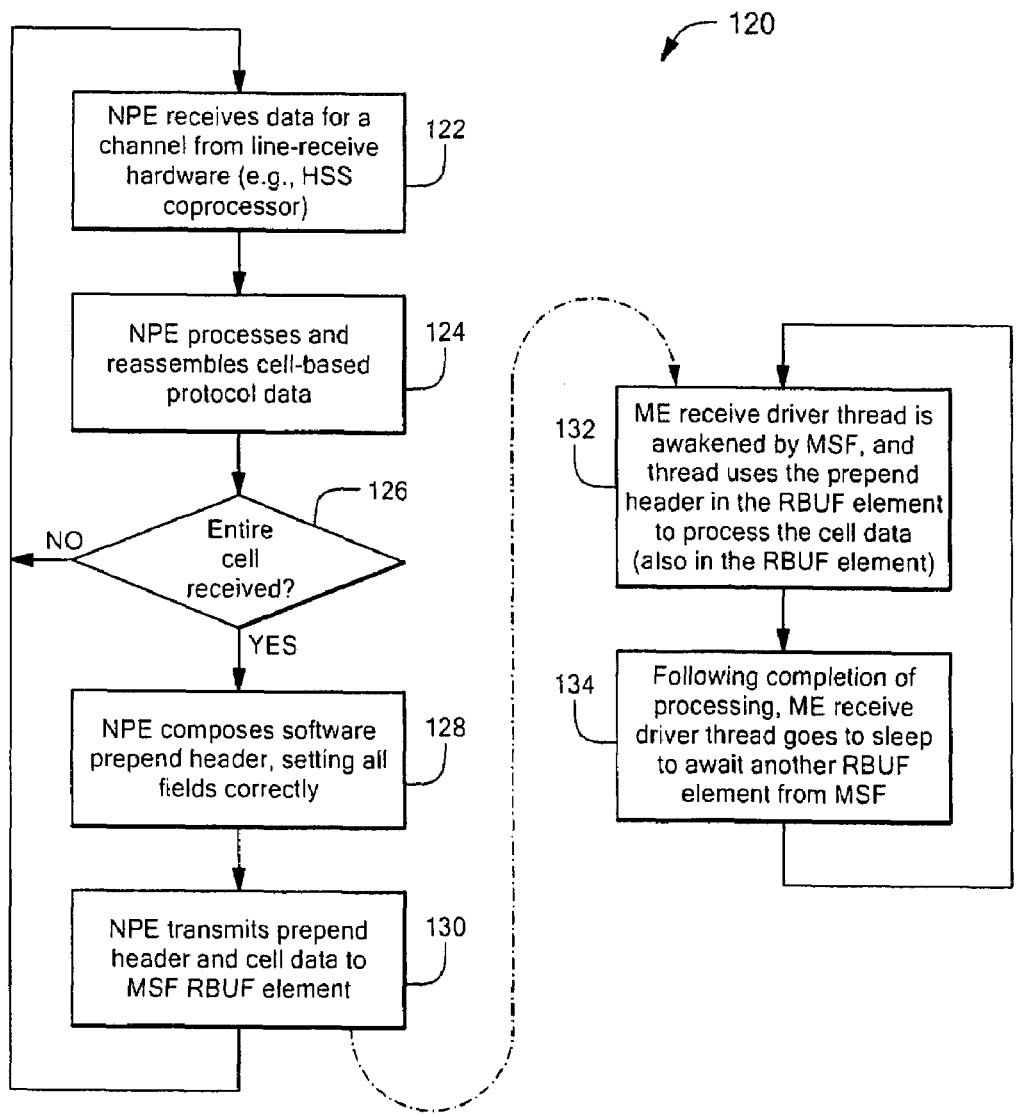
FIG. 5 is a flow diagram depicting operation of the NPE and ME when the NPE is operating in PHY mode on receive for cell-based protocols.

Referring to FIG. 5, an exemplary receive operation for cell-based protocols 120 is as follows. The NPE 22 receives 122 data for a particular TDM channel via its HSS interface or co-processor 28. The NPE 22 processes and re-assembles 124 the cell-based protocol data for the channel. The NPE 22 determines 126 if an entire cell has been received. If it has not, the NPE continues to receive, process and reassemble data (at 122, 124). If, at 126, it is determined that an entire cell has been received, the NPE 22 prepends 128 the cell with a software prepend header (formatted as shown in FIG. 3B). The NPE MSF co-processor sends 130 the programmed cell along with the software prepend header to an RBUF element of the RBUF designated by the MSF interface hardware.

One of the ME threads designated as a receive thread (receive driver) and awakened by the MSF interface uses 132 the software prepend header (in the RBUF element described by the RSW) to process the cell data (stored in that same RBUF element). Upon completion of the processing by the ME receive thread, the ME receive thread goes to sleep 134 to await signaling from the MSF interface that another RBUF element is ready to be processed. Alternatively, the ME receive thread could operate according to a polling mechanism, for example, it could poll the MSF interface, or otherwise determine that it should process contents of an RBUF element.

The ME receive thread extracts the TDM channel number from the Channel-ID field 80 of the software prepend header 72. The ME receive thread performs reassembly based on the receive context for this TDM channel and other parameters from the software prepend header 72.

In one embodiment, the ME-to-NPE interworking architecture supports simultaneous operation of cell- and frame-based protocols. In this case, the same MSF PHY channel and RBUF partition is used for both the cell and frame traffic. The setting of the C/F field 82 of the software prepend header 72 will indicate whether the traffic is cell or frame based, with a '0' indicating frame-base traffic and a '1' indicating cell-based traffic. For cell-based traffic, the ME and NPE operate in the cell-based mode of operation. For frame-based traffic, the ME and NPE operate in the frame-based mode of operation. The RBUF element size should be such that it accommodates the data chunk whether it be a portion of a frame or an entire cell, along with the software prepend header.

Operations in the transmit direction will now be described. At a high level, a transmit driver or transmit thread of an ME transmits data into TBUF elements of the NPE MSF PHY-channel 60. The NPE MSF co-processor 38 drains the data from the TBUF elements. The NPE 22 then transmits the data onto the appropriate TDM serial channels via the HSS interface 28.

Flow control is an integral part of the transmit operation. Flow control on channelized interfaces such as the HSS interface 28 can be complicated by a number of issues. For example, there can be many outgoing TDM channels connected to the HSS interface (a maximum of 256 across 16 E1 links, for example), and all of these channels can share the same MSF PHY channel. Thus, the flow control mechanism must ensure that there are no underflows, in particular, critical underflows (in the case of frame-based data, as discussed earlier) or overflows on each of the TDM channels. Of course, critical underflows would not occur if the ME transmitted to the NPE whole frames instead of chunks of frames at different points in time; however, transmitting a whole frame (which could be a very large frame of several kilobytes) could block the MSF PHY channel for long periods of time, causing the throughput of other TDM channels to deteriorate significantly. The flow control mechanism for the frame-based protocols is therefore designed to eliminate critical underflows without degrading throughput on individual TDM channels.

Figure 6:
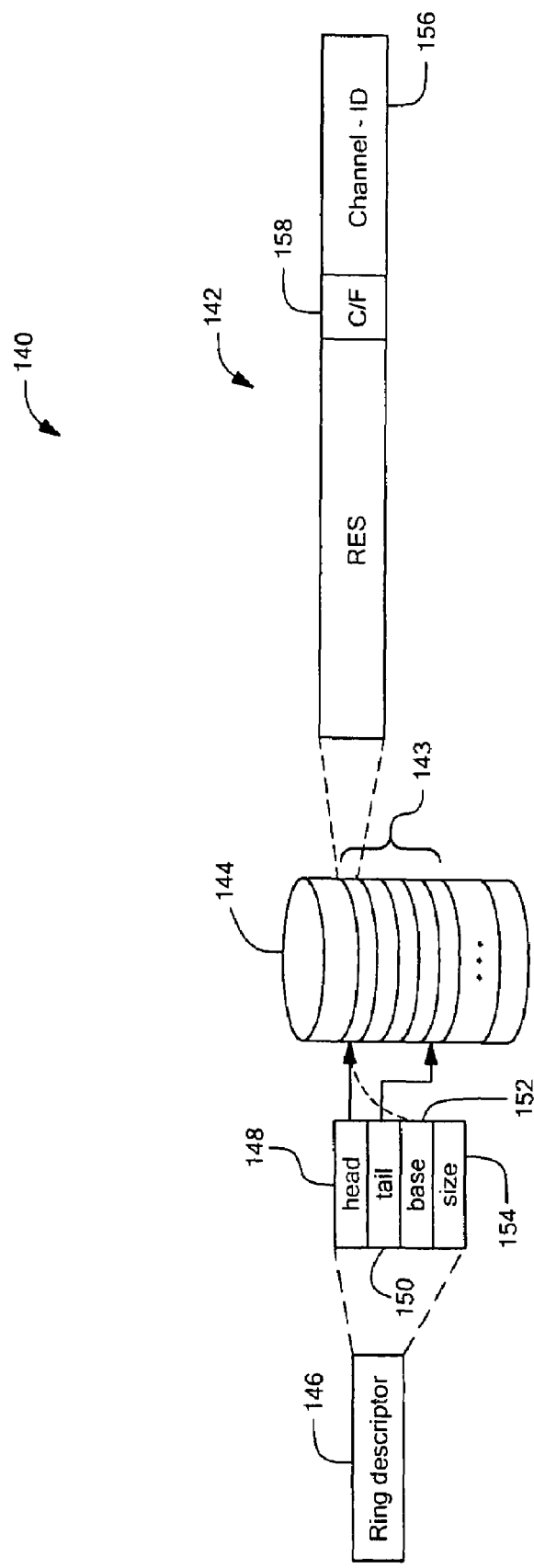
FIG. 6 is depiction of a communication data structure used for flow control on transmit for frame-based protocols when the NPE is operating in the PHY mode.

The flow control communication between the ME 20 and the NPE 22 for the frame-based protocols take place via a communication data structure in the form of one of the scratch rings 54 in the scratchpad memory unit 46. Referring to FIG. 6, an exemplary scratch ring used for flow control communication, a flow control ring 140, is shown. The flow control ring 140, which is shared by the NPE 22 and the ME 20, is used to exchange flow control information in the transmit direction in the case of frame-based protocols. The flow control ring 140 includes ring entries 142 of ring data 143 on a scratchpad RAM 144, as well as a ring descriptor 146 that provides a pointer to the beginning of the ring data ("head" 148) and a pointer to the end of the ring data ("tail" 150). Other information, such as a base 152 and ring size 154, may be contained in the descriptor 146 as well.

Still referring to FIG. 6, the ring entry 142 is a flow control message formatted to include the following information: a Channel-ID 156 to specify the channel number for the flow control message and a cell/frame (C/F) indicator 158 to indicate if the data on the channel is cell-based or frame-based. Other information may be included as well.

The flow control ring 140 is used by the ME 20 and NPE 52 to prevent underflows on individual TDM channels in frame-based mode. The NPE 52 writes entries to the flow control ring 140 to request more data on individual TDM channel numbers and the ME 20 reads the requests to service those channels. The flow control ring 140 is a common structure used for all of the TDM channels (for frame-based protocols).

Although the flow control ring 140 is shown as a hardware ring, it will be appreciated that the flow control ring 140 may be implemented in software, for example, in the SRAM 52. Other data structures or communication mechanisms could be used (in lieu of the flow control ring) to enable the information contained in the flow control message 142 to be exchanged between ME and NPE.

Figure 7:
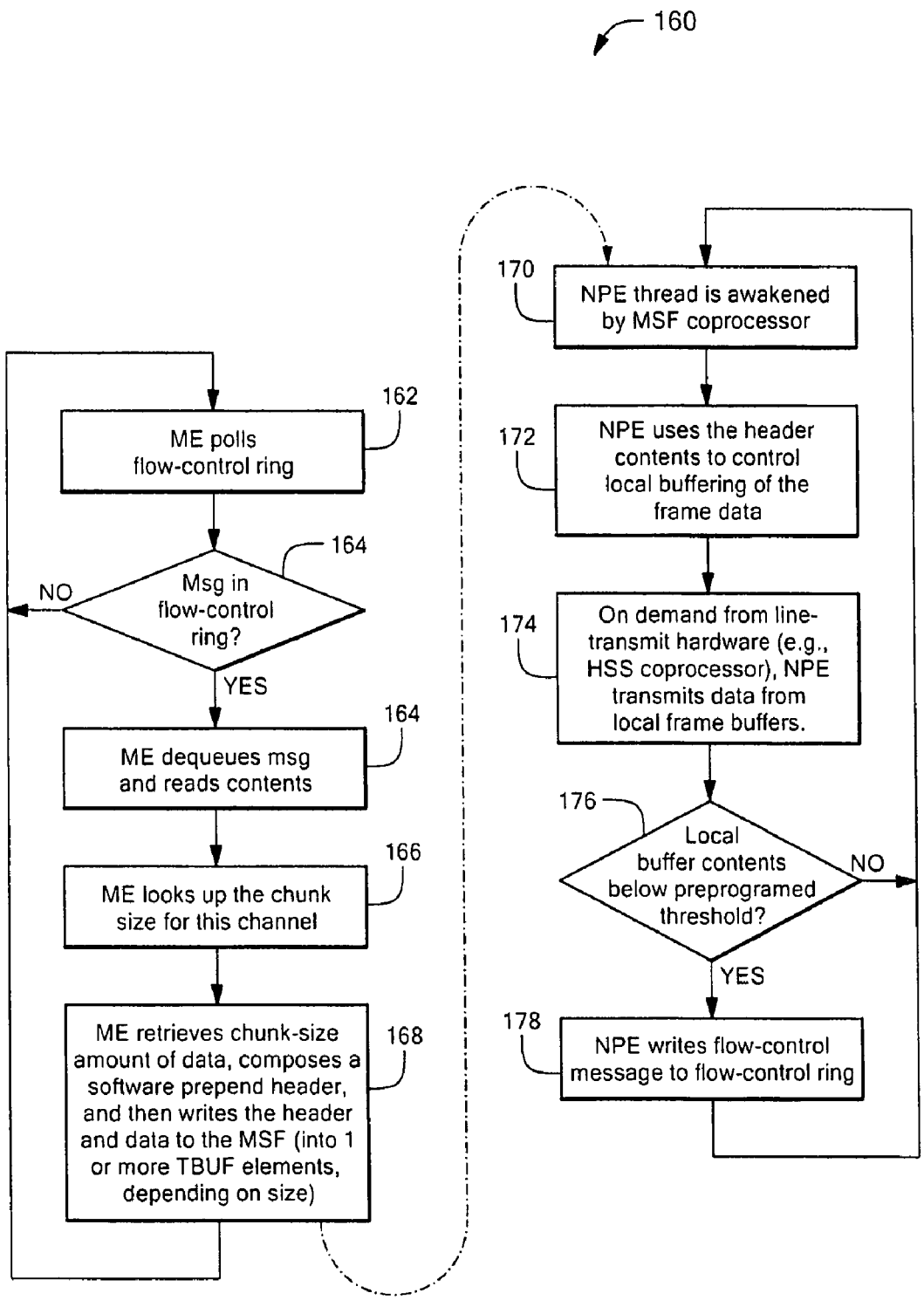
FIG. 7 is a flow diagram depicting operation of the NPE and ME when the NPE is operating in PHY mode on transmit for frame-based protocols with flow control.

Referring to FIG. 7, an exemplary frame-based transmit operation with flow control 160 is shown. A thread (or threads) configured as an ME scheduler periodically checks (polls) 162 the flow control ring 140 for flow control messages. If, at 163, the ME scheduler determines that there is at least one message in the flow control ring, the scheduler (in conjunction an ME queue manager) dequeues and reads 164 the next flow control message on the flow control ring. Alternatively, instead of using a polling mechanism, the ME scheduler may be interrupt driven, that is, respond to an interrupt generated when an entry is placed into the flow control ring. The ME determines 166 the amount of data to be provided (that is, the number of chunks) for the channel corresponding to the channel ID specified by each flow control message based on the type of channel. For example, a single chunk (or some other number of chunks) may be provided for an S-channel, and three (or some other number) of chunks may be provided in the case of an L-channel. Differentiating this way, in terms of sending less data for the S-channels and more data for the L-channels, helps the overall throughput of the system and achieves a very good utilization of the MSF PHY channel. The ME transmit driver, the thread or threads responsible for the necessary processing for transmit, provides 168 the requested data by providing the appropriate frame data (possibly retrieved from DRAM) in a chunk along with a software prepend header (as shown in FIG. 3B) to an allocated TBUF element (or in multiple chunks and with multiple headers to multiple allocated TBUF elements, if needed). It also sends the MSF interface a TCW for each TBUF element that is filled by the transmit thread. It should be noted that the ME will provide a number of bytes of frame data corresponding to the number of chunks required for the channel, or, alternatively, as much frame data as is available for transmit if the amount of available frame data is less than the required number of chunks.

The NPE MSF co-processor reads the first byte of the TBUF element (which is the NPEID 92, FIG. 3B) and, if the NPEID on the TBUF element matches its own ID, it reads the TBUF element; if there is no match, it understands that the TBUF element is meant for other NPE(s) and waits for the next TBUF element. If the TBUF element belongs to the current NPE, the NPE reads the TBUF element and awakens 170 the NPE transmit thread to process the contents of the TBUF element. The NPE transmit uses 172 the contents of the software prepend header to control local buffering of the chunks per channel based on the channel-ID. The NPE transmit thread transmits 174 the contents of the local buffer via the HSS co-processor at the configured channel rate.

After transmit, the NPE transmit thread determines 176 if the local buffer contents are below a pre-programmed threshold. The NPE has a channel-queue size threshold for each channel queue. The threshold size may be 128 B for the L-channel and 64 B for the S-channel, for example. If the buffer size on the channel queue falls below the pre-programmed threshold, the NPE 22 writes 178 a flow control message to the flow control ring. As described earlier, the flow control message serves as a request to the ME to provide more data on a particular channel.

As mentioned above, critical underflow is a serious problem with frame-based protocols. The polling frequency for the flow control (underflow) messages by the ME scheduler is a key factor in making sure that critical underflows do not occur for all practical purposes.

The peak rate for flow control messages may be obtained as follows. Each timeslot is 1 B worth of data. The transmission time for a timeslot on a 16 E1/T1 bandwidth is approximately ¼ microsecond. A channel can be assigned a minimum of 1 timeslot to a maximum of 32 timeslots. The worst-case rate of flow control messages would be achieved if all of the channels are assigned 1 timeslot each. This means all channels are S-channels and have a flow control threshold of 64 B. Assuming all channels have 64 B of data to send and send the data out (1 B at a time), they will register a flow control message with the ME scheduler since the channel buffer occupancy falls under 64 B threshold. Under these conditions, the ME will have to poll the flow control ring every transmission time of 1 B worth of data, which is ¼ microsecond. This is the peak polling rate.

Transmit operation for cell-based mode will now be described. The TBUF element size is set to accommodate the total of the cell size and the software prepend header. Each TDM channel has a per-channel queue registered with the queue manager on the ME. The queue manager on the ME operates in cell mode for these channel queues. The cell size is pre-configured to a constant value (e.g., 48 B in the case of ATM). The scheduler on the ME schedules cells on the channel queues according to the cell scheduling algorithm (in the case of ATM, ATM traffic management with per-port shaping is a very commonly used cell scheduling mechanism, in which case each of the channels, treated as ports will be shaped to CBR at the configured channel rate). This channel could carry several individually shaped ATM virtual circuits.

If there is no flow control asserted on the channel, the scheduler issues a dequeue request to the queue manager for this channel. The dequeued cell descriptor is communicated to the ME transmit driver, which does the necessary processing for transmit—including obtaining the cell payload and header, updating transmit context for the channel and doing the necessary clean up of buffers if applicable. It then prepends the cell with the software prepend header (shown in FIG. 3B) and fills the TBUF element, possibly from both SDRAM (for the cell payload and header) and the ME local storage (for the prepend header) simultaneously. It then writes the TCW onto the corresponding CSR. The NPE MSF co-processor drains the TBUF element and hands the element contents to the NPE. The NPE buffers the cells for the channel based on the channel-ID in the software prepend header and drains the cells from the buffer at the configured channel rate.

Figure 8:
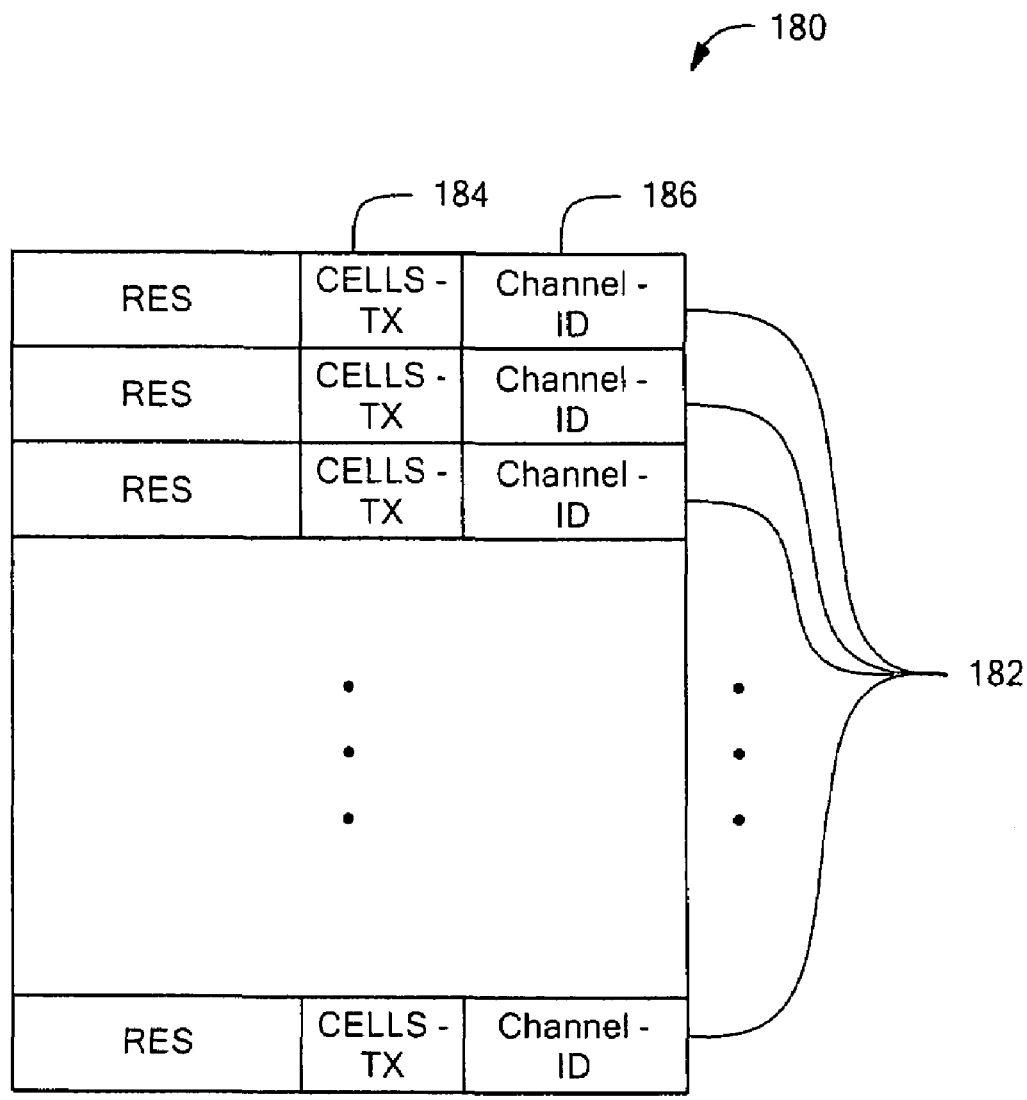
FIG. 8 is a depiction of communication data structure used for flow control on transmit for cell-based protocols when the NPE is operating in the PHY mode.

The flow control communication for the cell-based protocols also takes place via shared memory, but with fixed memory locations being assigned for each of the channels handling cell traffic. Referring to FIG. 8, a communication data structure shown as a cell-based flow control shared memory 180 includes a memory location 182 for each cell channel. The memory location 182 stores a count value (CELLS_TX) 184 for the channel to which it is assigned. The cell count is the number of cells that have been transmitted on the channel. The locations are written by the NPE 52 and read by the ME 20. The NPE periodically updates the cell count 184 for a TDM channel. In one embodiment, the count value is an 8-bit quantity that wraps around after 256 cells have been transmitted. The memory location can store other information as well, for example, a channel ID 186 (as shown). In one embodiment, the cell-based flow control information 180 is stored in the counters 56 portion of the scratchpad memory unit 46.

The flow control processing for the cell channels on the MEs can take place at a fixed programmable frequency based on the configured channel rate and the available channel buffering on the NPE. Also, the time between two consecutive flow control operations on a channel should be less than the time taken to overflow the flow control counters.

Figure 9:
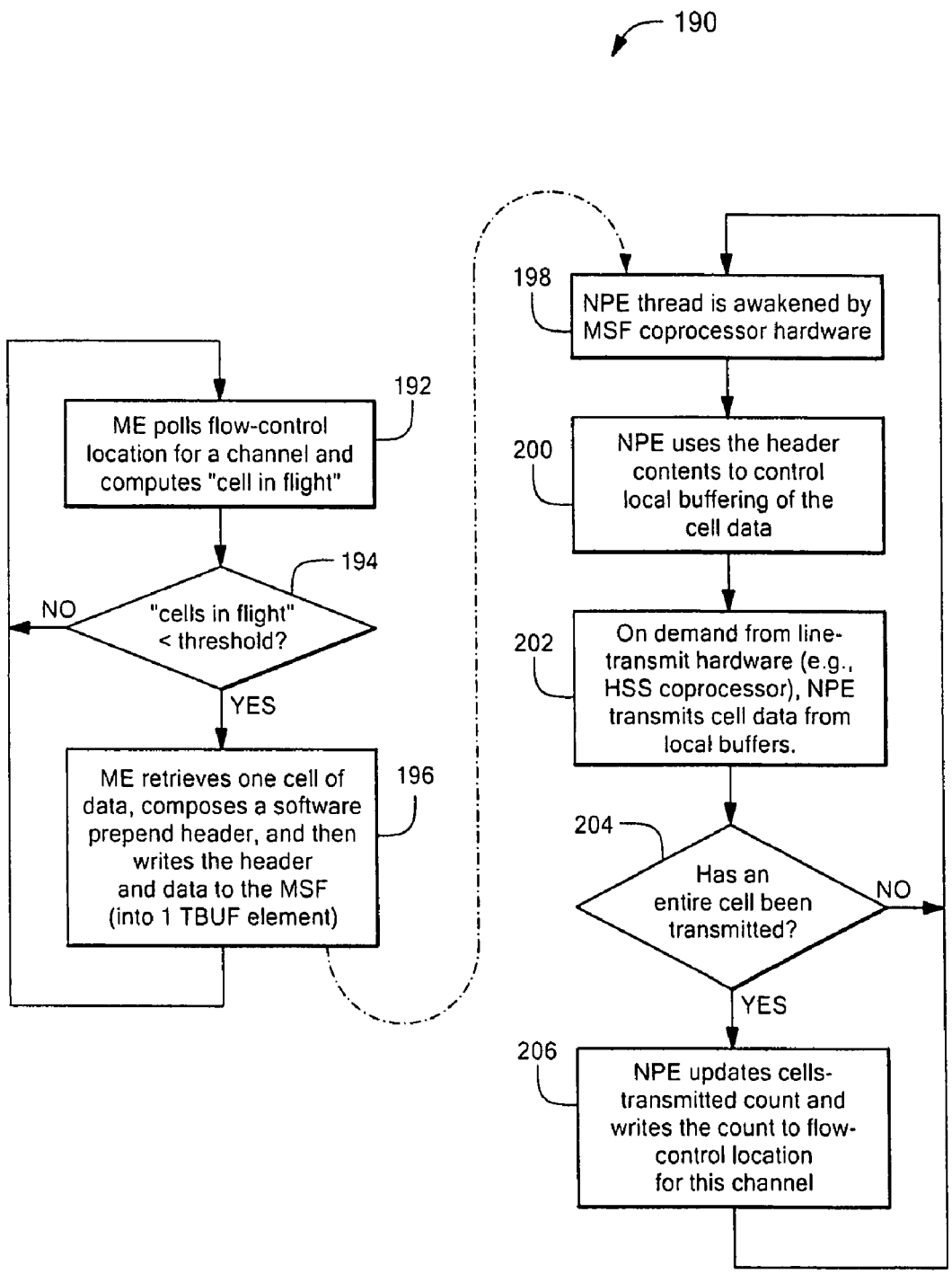
FIG. 9 is a flow diagram depicting operation of the NPE and ME when the NPE is operating in PHY mode on transmit for cell-based protocols with flow control.

Referring to FIG. 9, flow control operation on an individual channel for cell-based protocols 190 is shown. At block 192, the ME scheduler periodically reads the CELLS_TX value 184 in the flow control location for the channel (location 182) and computes the difference between that value and a count of the number of cells scheduled on the channel (maintained by the ME scheduler in a variable 'CELLS_SCH')as indicative of the number of "cells in flight". The ME determines if the computed "cells in flight" number is less than a predetermined threshold "DELTA", where DELTA is a pre-configured constant value for the channel that represents the maximum number of packets in flight in the system after which the flow control should be proactively applied. If the "cells in flight" is less than the threshold DELTA, and referring to block 196, the scheduler increments the CELLS_SCH and schedules a cell for transmit, causing the ME transmit thread to provide 196 a cell of data along with a software prepend header to an allocated TBUF. If, at 194, it is determined that the number of cells in flight is greater than or equal to threshold DELTA, the ME applies flow control on the channel. On the NPE side, the MSF co-processor awakens 198 the NPE transmit thread. The NPE transmit thread uses 200 the software prepend header to control local buffering of the cell data. On demand from the HSS co-processor, the NPE transmit thread transmits 202 cell data from the local buffers. The NPE transmit thread determines 204 is an entire cell has been transmitted. If an entire cell has been transmitted, the NPE updates 206 the CELLS_TX count stored in the flow control location for the channel to reflect a cell transmission on that channel.

The architecture is extensible to simultaneous operation of cell and frame based protocols. In such a case, the same MSF PHY channel and TBUF partition is used for both the cell and frame traffic. The C/F field of the software prepend header will indicate whether the traffic is cell or frame based. For the cell-based traffic, the ME and NPE will work in the cell mode of operation. For the frame-based traffic, the ME and NPE will work in frame mode of operation. The TBUF element size should be such that it accommodates the frame chunk or the cell along with the software prepend header.

As mentioned earlier, the NPE can operate in either PHY or ME co-processor mode. In the ME co-processor mode of the ME-NPE interaction, the ME treats the NPE as a co-processor/hardware accelerator. In the ME co-processor mode, the communication between the two is invoked by the ME. In one embodiment, only one NPE operates in the ME co-processor mode (using its internal accelerator or co-processor 40, shown in FIG. 1). An example of the usage of the ME co-processor mode would be the use of the NPE to perform IPSec based packet encryption and/or decryption for the ME. In such a scenario, the pointers to packets to be encrypted/decrypted are passed to the NPE by the ME. The NPE performs the encryption/decryption, and returns pointers to the encrypted/decrypted payload back to the ME 20 for further processing. The ME 20 to which the encrypted payload pointers are returned could be either the same ME from which the request for encryption originated or a different ME. Other co-processor tasks could include other types of crypto-related functions, such as authentication, or other hardware accelerator operations, e.g., hashing.

In one embodiment, scratch rings/scratch ring entries are the communication data structures used for communication between the MEs and an NPE operating as ME co-processor. An ME uses one scratch ring to pass the packet pointers to the NPE in the co-processor mode. For the return communication, another scratch ring could be used or the communication could be multiplexed onto the existing inter-ME scratch ring, depending upon the application, by having the NPE write to this scratch ring atomically. In the event that scratch rings are unavailable, for example, due to a shortage in the scratchpad memory, rings in the external memory, for example, in the SRAM 52, could be used.

Figure 10A:
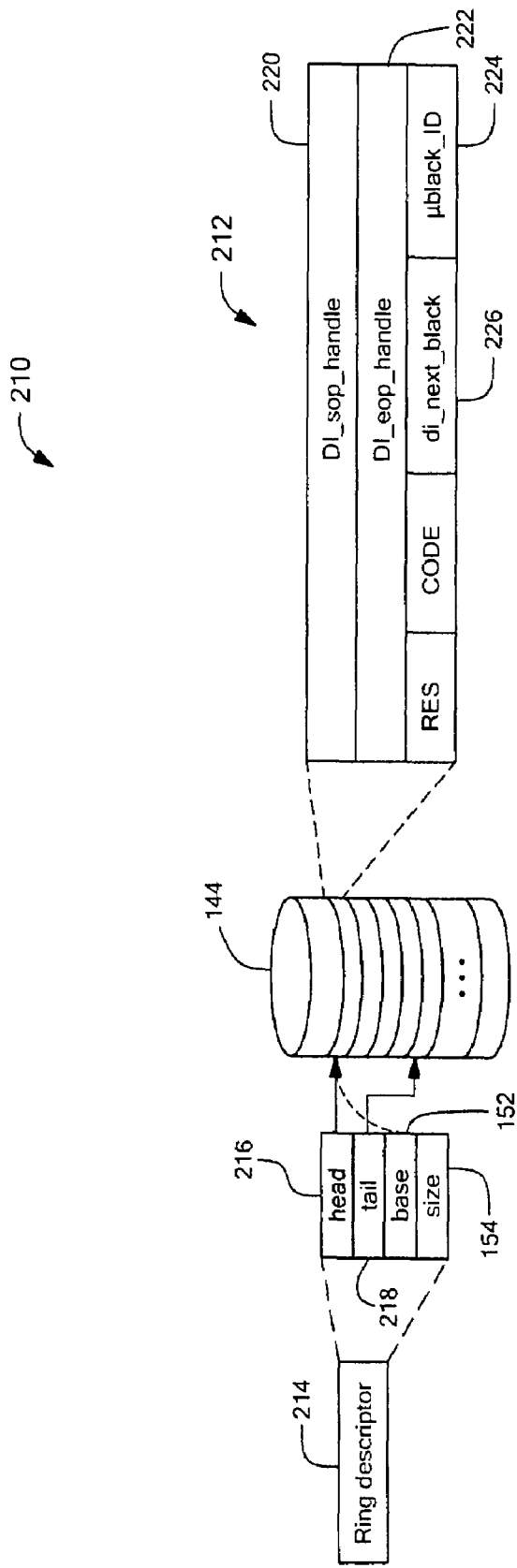
FIGS. 10A-10B are depictions of communication data structures used by the NPE and ME when the NPE is operating in an ME co-processor mode.

Referring to FIG. 10A, an exemplary scratch ring as communication ring 210 for the ME-to-NPE communication is shown. The overall ring structure is much the same as that shown in FIG. 6 (for the scratch ring used for frame-based flow control). It includes ring entries 212 on the scratchpad memory 144, as well as a ring descriptor 212 with a head 216 and tail 218 to point to the first and last entries of ring data. Each ring entry 212 is formatted to include the following parameters: an SOP buffer descriptor 'dl_sop_handle' 220 for the frame; an EOP buffer descriptor 'dl_eop_handle' 222 for the frame; an ID of the ME microblock 'Microblock_ID' 224 that is communicating the information to the NPE; an ID of the microblock 'dl_next_block' 226 that is to receive the processed packet from the NPE; and a code ('CODE')228 that represents the nature of the work to be done on the NPE as co-processor. The term "microblock" refers to a modular block of network processing software.

Figure 10B:
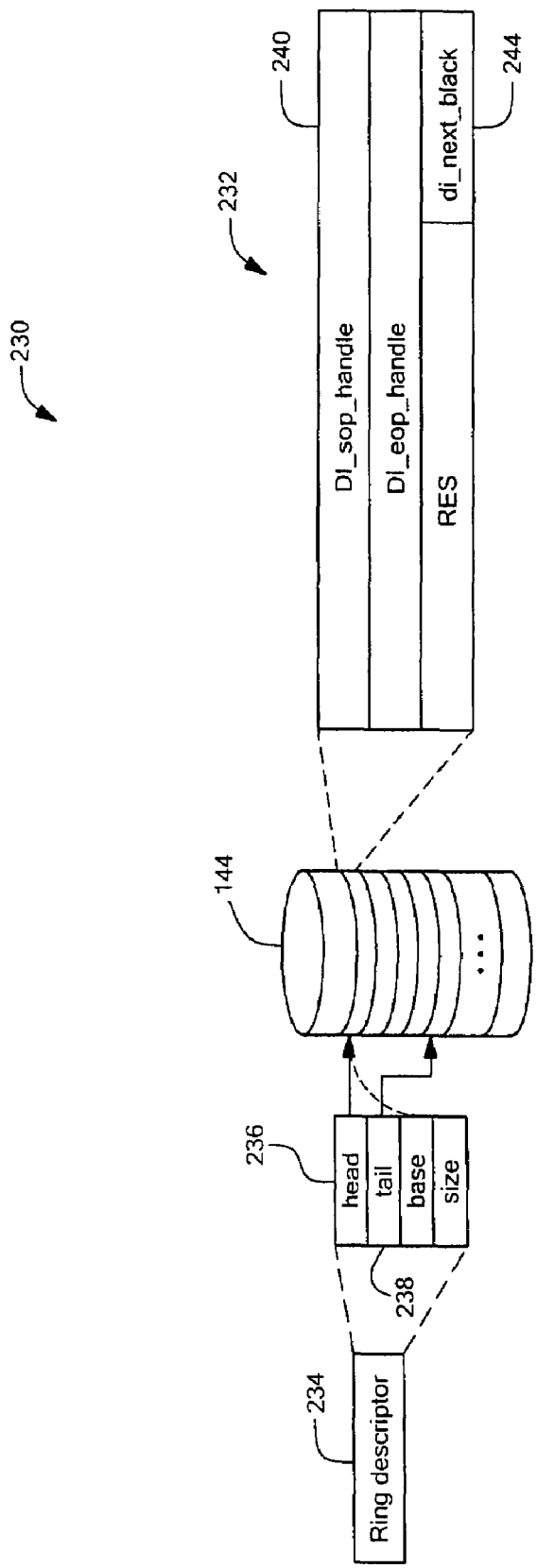

Referring to FIG. 10B, an exemplary scratch ring as communication ring 230 for the NPE-to-ME communication during co-processor mode operation is shown. The overall ring structure is much the same as that shown in FIG. 6 and FIG. 10A. The communication ring 230 includes communication control structures or ring elements (or entries) 232 on the scratchpad memory 144, as well as a ring descriptor 234 with a head 236 and tail 238 to point to the first and last elements of ring data. Each ring element 232 is formatted to include the following parameters: an SOP buffer descriptor 'dl_sop_handle' 240 for the frame; an EOP buffer descriptor 'dl_eop_handle' 242 for the frame; and an ID of the microblock 'dl_next_block' 244 that is to receive the processed packet from the NPE.

Figure 11:
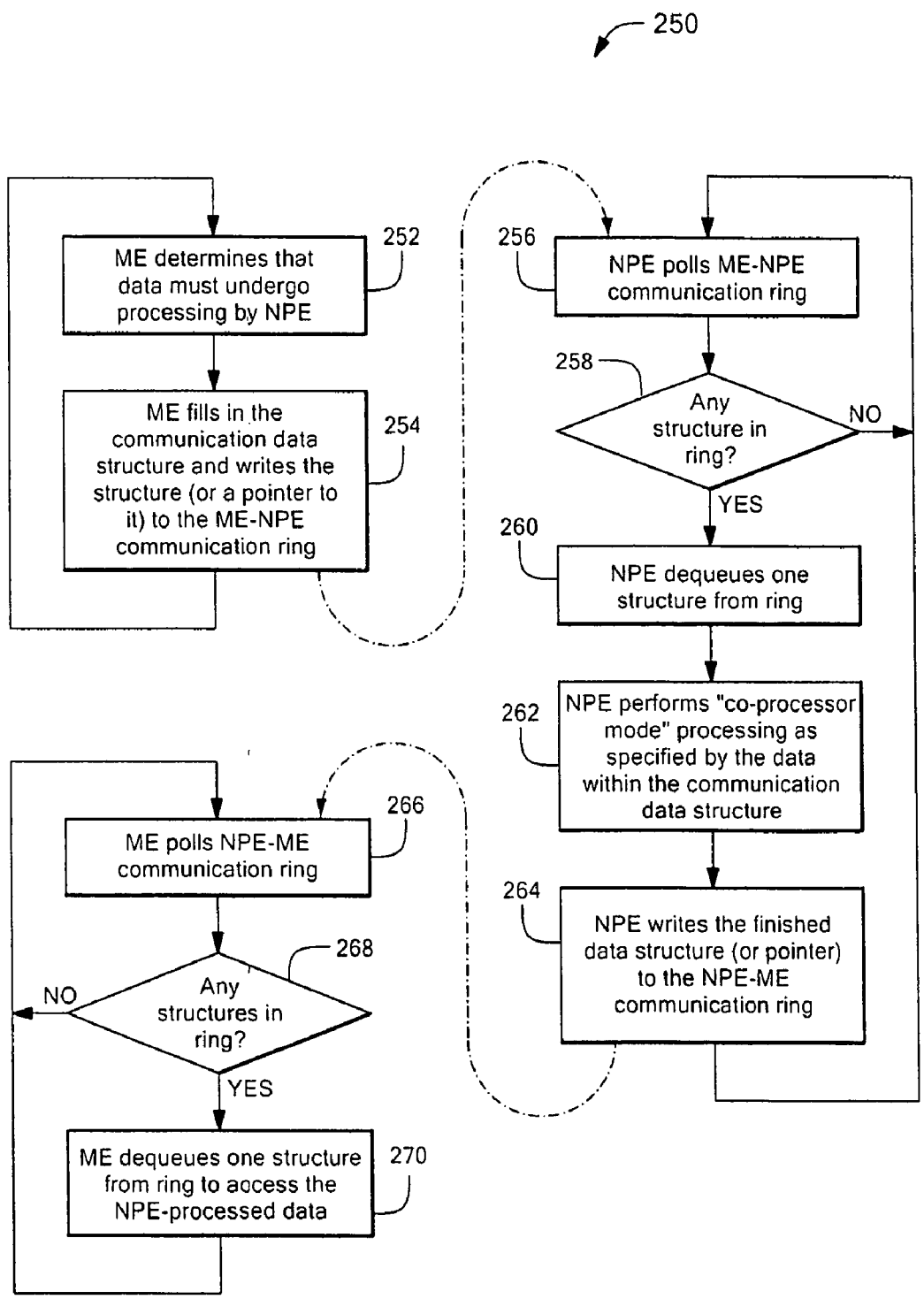
FIG. 11 is a flow diagram depicting operation of the NPE and ME when the NPE is operating in the ME co-processor mode.

Referring to FIG. 11, an exemplary ME co-processor mode of operation 250 of the NPE and ME when the NPE is operating as an ME co-processor is shown. The ME determines 252 that data must undergo processing by the NPE (as ME co-processor). The ME writes 254 a corresponding communication data structure (ring entry) to the ME-NPE communication ring. The NPE as co-processor polls 256 the communication ring at a pre-programmed rate. Preferably, the polling rate caters to the maximum rate at which traffic can be provided by the ME to the NPE/co-processor. The NPE/co-processor determines 258 if there are any communication data structures on the communication ring. If not, the NPE continues polling (at 256). If it is determined that there is at least one communication data structure on the communication ring, the NPE dequeues/reads 260 the next communication data structure from the communication ring. The NPE uses the information in the communication data structure to access the buffers and buffer descriptors that hold the frame payload and processes 262 on the frame data according to the specified code. It is generally assumed that the buffers are stored in DRAM and the buffer meta-data are stored in SRAM (for low end applications buffer descriptors may well be stored in DRAM). It is also assumed that the other parameters that are needed for the completion of the work by the NPE on the packet will be stored in the packet buffer meta-data and will be accessible by the NPE.

Once the work on the frame is completed, NPE/co-processor writes 264 the communication data structure (shown in FIG. 10B) to the NPE-ME communication ring where it can be read by the ME. The ME polls 266 the NPE-ME communication ring for new communication data structures. If the polling detects a new structure on the NPE-ME communication ring (at 268), the ME dequeues 270 the next communication data structure on the NPE-ME communication ring to access the NPE-processed data.

If the NPE-ME communication ring happens to be an exclusive NPE-ME ring, then the corresponding ME microblock with the correct dl_next_block value, that is, the microblock whose ID matches with the dl_next_block value 244, reads the packet. If the NPE-ME communication ring happens to be an inter-ME communication ring to which the NPE writes the packet atomically, the packet may not always be read by the microblock with the right dl_next_block value. In such a case, it is the responsibility of the dispatch loop to route the packet to the correct microblock. Once the data reaches the correct microblock, that is, that microblock continues the processing on the packet.

Thus, the architecture of the network processor 12 contemplates different possible ME-NPE interworking scenarios and provides a solution for each. It addresses the differences in computational/communication capabilities between the two types of processing elements within the context of both frame- and cell-based communications.

Although the system 10 illustrates an embodiment in which the ME 20 has the capability to receive network data from either the NPE 22 or external media device(s) 14, it will be appreciated that the network processor 12 need not be connected to an external media device. The PHY mode of operation, in particular, does not involve data received from any other "PHY" device but the NPE 22. The co-processor mode, on the other hand, need not be limited to the processing of data that originates with the NPE 22. That is to say, data may arrive at the ME 20 by way of the NPE 22 or another device (such as external media device 14) and then be handed off by the ME 20 to the NPE 22 for further processing. Once the processing of the NPE in co-processor mode is completed, the data is returned to the ME 20 (as discussed above). Once the ME processing is completed, data to be transmitted can be provided to the NPE 22 or external media device 14 as appropriate.

Figure 12:
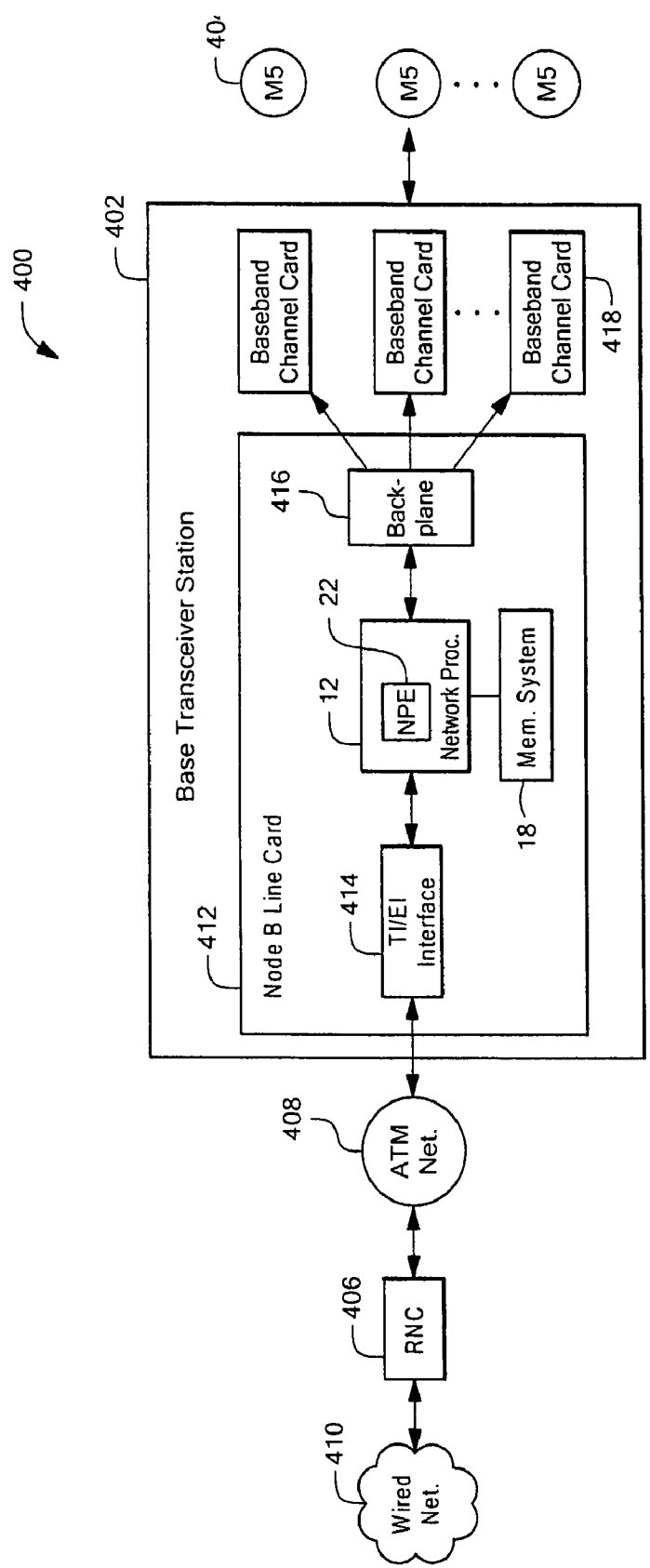
FIG. 12 is a block diagram of an exemplary application environment in which the network processor shown in FIG. 1 could be used.

The network processor 12 can be used in many different application environments, for example, a wireless network environment based on radio access network as a transport protocol, as shown in FIG. 12. Referring to FIG. 12, a networking system 400 includes a base transceiver station (BTS) 402 coupled to mobile stations 404, as well as a radio network controller (RNC) 406 via an ATM network 408. The RNC 406 is connected to other systems, for example, systems or devices coupled to a wired network 410 (which can include the Internet). The BTS 402 includes a Node B line card 412 that includes the network processor 12 (from FIG. 1).

On the line card 412 the network processor 12 is connected to the following: the memory system 18 (also from FIG. 1), a T1/E1 interface device 414 that couples one of the NPEs 22 to the ATM network 408. The line card 412 also includes some type of backplane connection 416 to other line cards, for example, baseband channel cards 418 for connecting to the mobile stations 404 operating in the cellular telephone network. In this application example, the NPE operates in the PHY mode and does the L1/L2 processing of receiving ATM cells over serial E1/T1 lines. The NPE then uses the cell-based communication techniques described earlier for communicating the data to the MEs, which do higher layer ATM cell processing, including cell-to-frame reassembly, traffic shaping and the like.

The example shown FIG. 12 is but one wireless networking application example. Other wireless networking applications of a processor such as network processor 12 that uses MEs and NPEs as described above can include, for example, processing support for node-Bs connected via an IP network (where, for example, the NPEs operate in PHY mode, receive/transmit data on the serial E1/T1 lines, perform HDLC processing and use frame based communication methods for sending/receiving variable sized frames to/from MEs, taking care of critical underflows and other challenges in the process), radio network controllers (RNCs), base station controllers (BSCs) and media gateways.

Apart from wireless networking applications, the above-described mechanisms can be applied to network processors used in wired networking applications also. Thus, other applications may include, for example, edge routers, remote access servers (RAS), and so forth. In the case of routers, the co-processor mode of operation could be utilized in applications in which the MEs use the NPEs for encryption/decryption/authentication purposes. In a RAS, both co-processor mode for security and PHY mode of operation for receiving/transmitting frames (and/or cells) on E1/T1 serial lines could be employed for interworking the MEs and NPEs.

Other embodiments are within the scope of the following claims.

What is claimed is:

1. A processor comprising:
a first multi-threaded processor engine configured for connection to a serial link;
a second multi-threaded processor engine, coupled to the first multi-threaded processor engine by an interface, to process data received by the first multi-threaded processor over the serial link and to provide the processed data to the first multi-threaded processor engine for transmission over the serial link, the second multi-threaded processor engine being capable of operating at a faster rate than the first multi-threaded processor engine; and
one or more communication data structures usable by the first and second multi-threaded processor engines to control interaction therebetween,
wherein at least one of the one or more communication data structures is usable by the first and second multi-threaded processor engines to control the rate at which the processed data is provided to the first multi-threaded processor engine by the second multi-threaded engine,
the at least one or more communication data structures includes a shared memory comprising memory locations corresponding to each of the channels that handles cell data, each memory location storing a count value indicating the number of cells transmitted by the first multi-threaded processor engine for the channel to which such memory location corresponds, the second multi-threaded processor engine being operable to poll the memory locations,
wherein the second multi-threaded processor engine, after polling one of the memory locations of a selected one of the channels, is operable to compare the count value with another count value indicative of a number of cells scheduled for transmission, maintained by the second multi-threaded processor engine, to determine a number of cells in flight.

2. The processor of claim 1 wherein the data comprise a frame-based protocol.

3. The processor of claim 2 wherein the frame-based protocol comprises High Data Link Control (HDLC).

4. The processor of claim 1 wherein the data comprise a cell-based protocol.

5. The processor of claim 4 wherein the cell-based protocol comprises ATM.

6. The processor of claim 5 wherein the cell-based protocol comprises Inverse Multiplexing for ATM.

7. The processor of claim 1 wherein the data comprises frame-based and cell-based protocols.

8. The processor of claim 1 wherein the at least one of the one or more communication data structures includes a flow control ring of entries written by the first multi-threaded processor engine and read by the second multi-threaded processor engine.

9. The processor of claim 8 wherein each flow control ring entry comprises a flow control message that includes a channel number identifying a channel corresponding to one of multiple channels supported by the serial link.

10. The processor of claim 9 wherein the second multi-threaded processor engine is operable to use the channel number to determine a flow control amount of data to be provided to the first multi-threaded processor engine for the channel identified by the channel number.

11. The processor of claim 10 wherein the second multi-threaded processor engine is operable to poll the flow control ring, and wherein the flow control amount of data and the frequency with which the flow control ring is polled are sufficient to prevent an underflow of data to the channel for transmission.

12. The processor of claim 10 wherein the second multi-threaded processor engine is operable to poll the flow control ring, and wherein the flow control amount of data and the frequency with which the flow control ring is polled are sufficient to prevent a critical underflow of data to the channel for transmission.

13. The processor of claim 1 wherein the multi-threaded second processor engine is operable to compare the number of cells in flight to a predetermined threshold to determine if flow control is necessary to prevent an overflow condition from occurring for the channel.

14. The processor of claim 1 wherein the interface comprises: receive buffers written to by the first multi-threaded processor engine and read by the second multi-threaded processor engine; transmit buffers written to by the second multi-threaded processor engine and read by the first multi-threaded processor engine; and wherein the receive and transmit buffers comprise buffer elements configured to store a software prepend header followed by a programmed number of bytes.

15. The processor of claim 14 wherein the first multi-threaded processor engine is configured to operate in a frame-base mode to receive and reassemble the data when the data comprises a frame-based protocol, and is further configured to operate in a cell-based mode to receive and reassemble the data when the data comprises a cell-based protocol.

16. The processor of claim 15 wherein one of the receive buffers is designated for use by the first multi-threaded processor engine, and wherein the first multi-threaded processor engine is operable to receive and process data until an entire data unit, comprising either a cell in the cell-based mode or up to a programmed number of bytes of frame data in the frame-based mode, has been received and reassembled, at which point the first multi-threaded processor engine appends to the reassembled data the software prepend header and writes the software prepend header and the reassembled data to an allocated one of the buffer elements in the designated receive buffer.

17. The processor of claim 16 wherein the second multi-thread processor engine is operable to use the software prepend header to further process the reassembled data.

18. The processor of claim 17 wherein the software prepend header includes an indicator of whether the reassembled data comprises cell data or frame data.

19. The processor of claim 1 wherein the first multi-threaded processor engine is configured to operate as a co-processor for the second multi-threaded processor.

20. The processor of claim 19 wherein the one or more communication data structures includes at least one communication ring to pass first messages from the second multi-threaded processor engine to the first multi-threaded processor engine to describe a location of data to be processed and type of processing to be performed by the first multi-threaded processor engine, and to pass second messages from the first multi-threaded processor engine to the second multi-threaded processor engine to describe a location of the data after processing.

21. The processor of claim 1 wherein the serial link can be any one of T1, E1 and J1 links.

22. A processor comprising:
a first multi-threaded processor engine;
a second multi-threaded processor engine operable to process data received from a network via a network interface; and
at least one or more communication data structures,
wherein the first multi-threaded processor engine is configured to operate as a co-processor for the second multi-threaded processor engine,
wherein the at least one or more communication data structures is usable by the first and second multi-threaded processor engines to control the rate at which the processed data is provided to the first multi-threaded processor engine by the second multi-threaded engine,
wherein the at least one or more communication data structures includes a shared memory comprising memory locations corresponding to each of the channels that handles cell data, each memory location storing a count value indicating the number of cells transmitted by the first multi-threaded processor engine for the channel to which such memory location corresponds,
wherein the second multi-threaded processor engine, after polling one of the memory locations of a selected one of the channels, is operable to compare the count value with another count value indicative of a number of cells scheduled for transmission, maintained by the second multi-threaded processor engine, to determine a number of cells in flight.

23. The processor of claim 22 wherein the network interface comprises the first multi-threaded processor engine.

24. The processor of claim 22 wherein the network interface comprises an external media device.

25. The processor of claim 22 wherein the at least one or more communication data structures comprises:
a first communication data structure usable to pass first messages from the second multi-threaded processor engine to the first multi-threaded processor engine to describe a location of data to be processed and type of processing to be performed by the first multi-threaded processor engine as a co-processor; and
a second communication data structure to pass second messages from the first multi-threaded processor engine to the second multi-threaded processor engine to describe a location of the data after processing by the first multi-threaded processor engine.

26. The processor of claim 22 wherein the type of processing to be performed by the first multi-threaded processor engine as a co-processor includes at least one cryptographic function.

27. The processor of claim 22 wherein the type of processing to be performed by the first multi-threaded processor engine as a co-processor includes authentication.

28. The processor of claim 22 wherein the type of processing to be performed by the first multi-threaded processor engine as a co-processor includes a hashing function.

29. A network device comprising:
a line card to couple to one or more data links, the line card comprising a network processor that comprises:
a first multi-threaded processor engine;
a second multi-threaded processor engine, coupled to the first multi-threaded processor engine by an interface, configured to process data received over the one or more data links via a network device or the first multi-threaded processor engine when such processor is configured for use as a physical layer device to receive and transmit serial data over at least one of the one or more data links, and to provide the processed data to the first multi-threaded processor engine for transmission if the data that was processed was received from the first multi-threaded processor engine; and
one or more communication data structures usable by the first and second multi-threaded processor engines to control interaction therebetween,
wherein at least one of the one or more communication data structures is usable by the first and second multi-threaded processor engines to control the rate at which the processed data is provided to the first multi-threaded processor engine by the second multi-threaded engine,
wherein the at least one or more communication data structures includes a shared memory comprising memory locations corresponding to each of the channels that handles cell data, each memory location storing a count value indicating the number of cells transmitted by the first multi-threaded processor engine for the channel to which such memory location corresponds,
wherein the second multi-threaded processor engine, after polling one of the memory locations of a selected one of the channels, is operable to compare the count value with another count value indicative of a number of cells scheduled for transmission, maintained by the second multi-threaded processor engine, to determine a number of cells in flight.

30. The network device of claim 29 wherein at least one of the one or more communication data structures is usable by the first and second multi-threaded processor engines to control the rate at which the processed data is provided to the first multi-threaded processor engine by the second microprocessor engine.

31. The network device of claim 29 wherein the first multi-threaded processor engine is configured to operate as a co-processor for the second multi-threaded processor during the data processing.

32. The network device of claim 31, further comprising: a first communication data structure usable to pass first messages from the second multi-threaded processor engine to the first multi-threaded processor engine to describe a location of data to be processed and type of processing to be performed by the first multi-threaded processor engine as a co-processor; and a second communication data structure to pass second messages from the first multi-threaded processor engine to the second multi-threaded processor engine to describe a location of the data after processing by the first multi-threaded processor engine.

33. A method comprising:
providing a first multi-threaded processor engine configured for connection to a serial link;
providing a second multi-threaded processor engine, coupled to the first multi-threaded processor engine by an interface, to process data received by the first multi-threaded processor over the serial link and to provide the processed data to the first multi-threaded processor engine for transmission over the serial link; and
enabling use of one or more communication data structures by the first and second multi-threaded processor engines to control interaction therebetween,
wherein at least one of the one or more communication data structures is usable by the first and second multi-threaded processor engines to control the rate at which the processed data is provided to the first multi-threaded processor engine by the second multi-threaded engine,
wherein the at least one or more communication data structures includes a shared memory comprising memory locations corresponding to each of the channels that handles cell data, each memory location storing a count value indicating the number of cells transmitted by the first multi-threaded processor engine for the channel to which such memory location corresponds,
wherein the second multi-threaded processor engine, after polling one of the memory locations of a selected one of the channels, is operable to compare the count value with another count value indicative of a number of cells scheduled for transmission, maintained by the second multi-threaded processor engine, to determine a number of cells in flight.

34. The method of claim 33 wherein enabling comprises:
enabling use of at least one of the one or more communication data structures by the first and second multi-threaded processor engines to control the rate at which the processed data is provided to the first multi-threaded processor engine by the second multi-threaded processor engine.

35. The method of claim 33 further comprising: enabling use of the first multi-threaded processor engine as a co-processor to the second multi-threaded processor engine.

36. The method of claim 35, wherein the communication data structures comprise: a first communication data structure usable to pass first messages from the second multi-threaded processor engine to the first multi-threaded processor engine to describe a location of data to be processed and type of processing to be performed by the first multi-threaded processor engine as a co-processor; and a second communication data structure to pass second messages from the first multi-threaded processor engine to the second multi-threaded processor engine to describe a location of the data after processing by the first multi-threaded processor engine.

* * * * *

UNITED STATES PATENT AND TRADEMARK OFFICE
CERTIFICATE OF CORRECTION

PATENT NO. : 7,391,776 B2 Page 1 of 1
APPLICATION NO. : 10/738407
DATED : June 24, 2008
INVENTOR(S) : Venkatachalam et al.

It is certified that error appears in the above-identified patent and that said Letters Patent is hereby corrected as shown below:

In the Drawings:
On Sheet 13 of 13, in FIG. 12 (below Reference Numeral 402), line 4, delete "40" and insert -- 404 --, therefor.

In column 14, lines 65-66, in Claim 15, delete "frame-base" and insert -- frame-based --, therefor.

Signed and Sealed this

Sixteenth Day of December, 2008

JON W. DUDAS
*Director of the United States Patent and Trademark Office*